Feb. 3. 1925.
J. H. LEACH
CUSHION TIRE
Filed Feb. 16. 1924
1,524,718
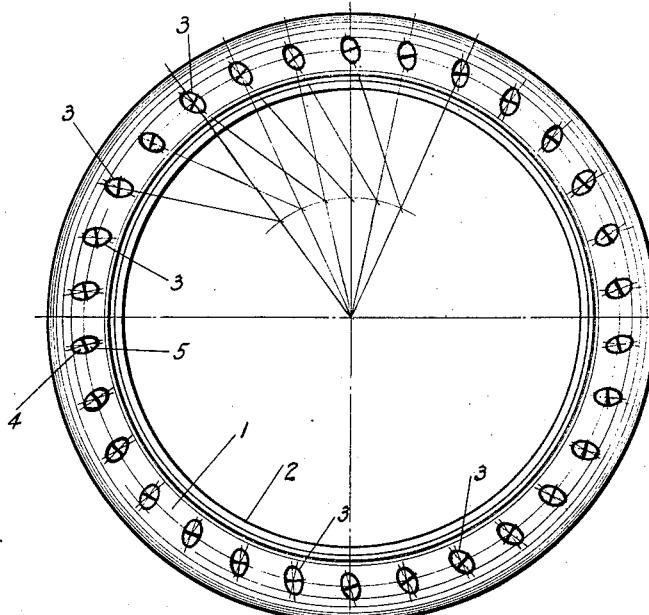
FIG. 1.
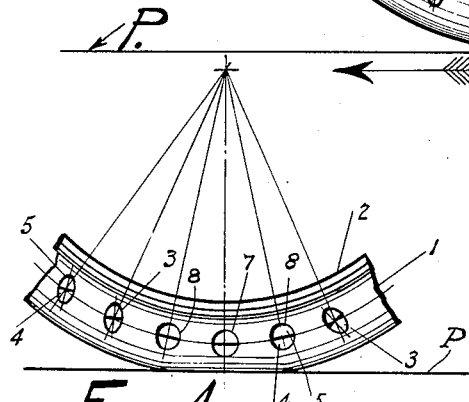
FIG. 4.
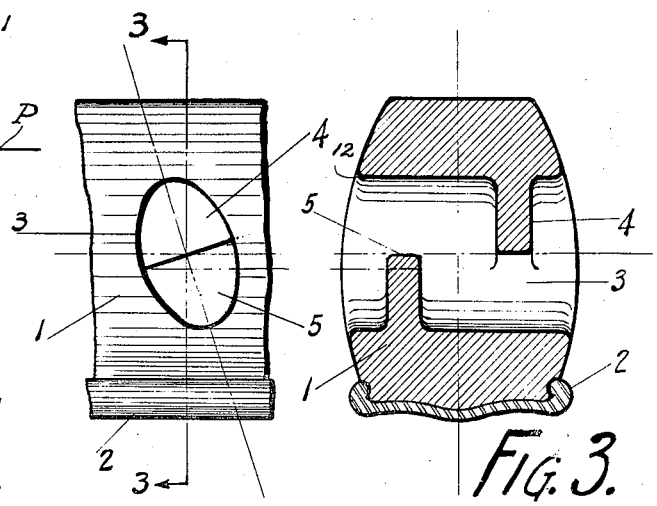
FIG. 2.    FIG. 3.
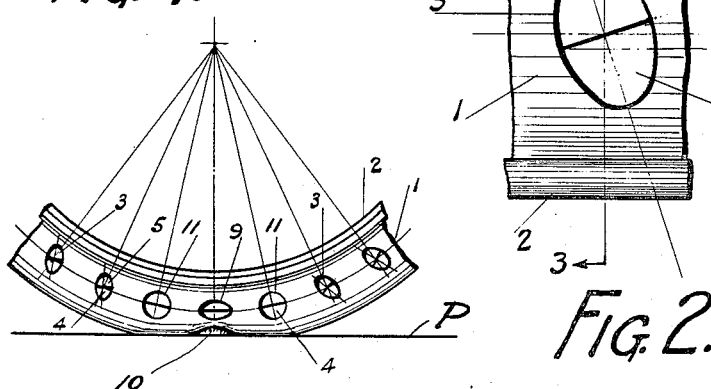
FIG. 5.
INVENTOR.
John H. Leach
BY
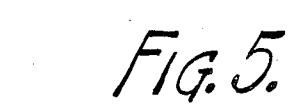
His ATTORNEY.

Patented Feb. 3, 1925.

1,524,718

UNITED STATES PATENT OFFICE.

JOHN H. LEACH, OF OAKLAND, CALIFORNIA.

CUSHION TIRE.

Application filed February 16, 1924. Serial No. 693,356.

*To all whom it may concern:*

Be it known that I, JOHN H. LEACH, a citizen of the United States, residing at Oakland, in the county of Alameda and State of California, have invented new and useful Improvements in a Cushion Tire, of which the following is a specification, and which is illustrated in the accompanying drawings.

My invention relates to vehicle tires of rubber, especially to the so-called cushion tires as made of rubber and compounds thereof, and particularly to a type of such cushion tire having openings extending in or through the sides of the tire to increase its resilience.

The objects of my invention are to provide a perforated cushion tire of this type which will have a longer life, will have less tendency to crack along the flexure lines, also to provide a tire having a maximum driving reactance through progressive release of especially formed resilient or compressible chambers, also to provide in such a tire elements having the characteristics of a "snubber" when encountering severe road shocks, and withal such a tire which can be easily molded so that it may be cheaply produced.

I achieve the objectives outlined above, by the cushion tire construction shown in the drawings accompanying this application and in which:—

Figure 1 is a side elevation of my complete tire in place on a rim. Fig. 2 is an enlarged fractional detail of the tire showing one of the special openings. Fig. 3 is a cross section through the line 3—3 of Fig. 2. Fig. 4 is a portion of the tire showing the change of oval holes to round holes when under pressure against the road. Fig. 5 is a similar view to the last showing the central hole under pressure reduced to an oval on account of the localized pressure of a stone or hump in the road.

By reference to Fig. 1 it will be seen that my tire has particular reference to the type of cushion tire made of substantially solid or reinforced rubber which has a series of openings or holes extending transversely through the tire from side to side between the supporting rim and the tread.

Such a tire has been known and used for some time, and it is to overcome certain weaknesses and to get a better resilient action that my improvements have been made.

Before describing my tire in detail it should be noted that the earlier tires of this type had plain holes extending through the body to give the increased resilience. These holes were usually round, though square holes were also tried. In any such holes it must follow that a pressure against the tire will deform the hole, if round they will flatten to ovals, if square to oblongs, and in so deforming they will be decreased in area,—and, if the pressure is very great, they will collapse or close entirely.

If the holes flatten too much or collapse, cracks in the surrounding rubber will speedily form, especially if the holes originally were angular, and the tire will soon be destroyed.

I have discovered that if the holes are made in oval form, and preferably placed with their longitudinal axes at a slight angle to radial lines on the tire, that at once an important difference in functioning results as holes thus formed do not flatten out and decrease in area with the same pressure and crack the rubber at the ends as would round holes, but on the contrary such holes actually increase in area upon external tire pressure through riding and they become round holes, then upon further pressure they again become oval holes but with their axes extending at substantially right angles to their original position.

Under greatly excessive pressure as might be caused by striking a curb, such holes might also flatten out, but I overcome this by providing optionally some or all of the oval holes with transverse ribs formed of the rubber of the tire body molded integral with the body, and which ribs act as "snubbers" in forming a resilient limit to the hole distortion or tire flexure, thus preventing a crack from starting.

In Figure 1 my tire 1 is shown on a rim 2 and with such a row of angularly placed oval holes 3 as described.

The ribs mentioned are numbered 4 and 5 and extend respectively from opposite sides of the holes substantially to the center line of the hole. From one to any number of ribs may be used in each hole, depending on the service required of the tire, and whether the ribs extend exactly at right angles across the hole is of course optional.

The ovals may of course be arranged with the longer axes exactly in radial lines, but the slight angle to radial lines as shown presents the successive ovals more nearly on their ends to the road pressure as the tire advances when rolled in direction of the arrow and the oval holes change to round, and also gives an increased turning effect to the wheel as the oval holes reassert themselves at the rear of the wheel as the pressure is relieved.

In Figure 4 the central hole 7 under greatest pressure against the pavement "P" is shown changed to round, as explained and the adjacent holes 8, 8, are almost round. But in Fig. 5 a stone or hump 10 is subjecting the tire to maximum pressure with a result that the hole 9 is changed to an oval one reversed from its original position, and the two adjacent holes 11, 11, are changed from the original ovals to round.

In Figure 2 an oval hole is shown in enlarged drawing to better reveal the ribs 4 and 5, and in the sectional view Fig. 3 the lateral spacing of the ribs is shown. In practice the ribs will be reversed in position in alternate holes, or "staggered" to equalize the snubbing effect around the tire, and of course any number of ribs from one or several to a hole will be used, depending on the service to which the tire will be put.

At the ends of the holes I preferably round the corners as shown at 12.

Having thus described my invention it will be evident that minor variations may be made in the shape of the holes, for they may be elongated without being true ovals, or they may be intermingled with ovals, and any such modifications as fall within the spirit of my invention are intended to be covered in my appended claims.

I claim:—

1. A cushion tire of the character described comprising a resilient tire body with holes extending therethrough from side to side, said holes having transverse resilient ribs extending partly across the holes.

2. A cushion tire of the character described comprising a resilient tire body with holes extending therethrough from side to side, said holes being of oval cross section and with resilient ribs extending from the ends of the ovals toward the center of the ovals.

3. In a cushion tire of the character described, a resilient tire body with holes therein to increase its resilience, resilient ribs in the holes to limit the flexure of the body adjacent the holes, a plurality of said ribs being positioned in each hole and extending from opposite sides thereof.

JOHN H. LEACH.